US 10,795,749 B1

(12) United States Patent
Fountain et al.

(10) Patent No.: US 10,795,749 B1
(45) Date of Patent: Oct. 6, 2020

(54) SYSTEMS AND METHODS FOR PROVIDING FAULT ANALYSIS USER INTERFACE

(71) Applicant: Palantir Technologies Inc., Palo Alto, CA (US)

(72) Inventors: Trevor Fountain, Nacogdoches, TX (US); Jiawei Marvin Sum, New York, NY (US); Rebecca Egger, San Francisco, CA (US); Siddharth Rajgarhia, London (GB); Thomas Alexander, Abu Dhabi (AE); Tyler Uhlenkamp, Central City, IA (US)

(73) Assignee: Palantir Technologies Inc., Palo Alto, CA (US)

( * ) Notice: Subject to any disclaimer, the term of this patent is extended or adjusted under 35 U.S.C. 154(b) by 149 days.

(21) Appl. No.: 15/634,549

(22) Filed: Jun. 27, 2017

Related U.S. Application Data

(60) Provisional application No. 62/513,174, filed on May 31, 2017.

(51) Int. Cl.
*G06F 11/00* (2006.01)
*G06F 11/07* (2006.01)

(52) U.S. Cl.
CPC ........ *G06F 11/079* (2013.01); *G06F 11/0739* (2013.01); *G06F 11/0751* (2013.01); *G06F 11/0769* (2013.01)

(58) Field of Classification Search
CPC .............. G06F 11/079; G06F 11/0739; G06F 11/0751; G06F 11/0769
See application file for complete search history.

(56) References Cited

U.S. PATENT DOCUMENTS

| 5,515,488 A | 5/1996 | Hoppe et al. |
| 6,324,659 B1 * | 11/2001 | Pierro ................ B61L 27/0094 |
| | | 714/48 |

(Continued)

FOREIGN PATENT DOCUMENTS

| CN | 102546446 | 7/2012 |
| CN | 103167093 | 6/2013 |

(Continued)

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

(Continued)

*Primary Examiner* — Jonathan D Gibson
(74) *Attorney, Agent, or Firm* — Sheppard Mullin Richter & Hampton LLP

(57) ABSTRACT

Systems, methods, and non-transitory computer readable media are provided for presenting a user interface for fault analysis. Fault information may be accessed. The fault information may identify faults for one or more machines. A fault analysis interface may be provided. The fault analysis interface may include an organization view, an instance view, a subsystem view, or a map view. The fault analysis interface may enable presentation of the organization view, the instance view, the subsystem view, and the map view. The fault analysis interface may display correlations of the faults using visuals and spatial locations of the visuals.

20 Claims, 7 Drawing Sheets

(56) References Cited

U.S. PATENT DOCUMENTS

| | | |
|---|---|---|
| 6,430,305 B1 | 8/2002 | Decker |
| 6,820,135 B1 | 11/2004 | Dingman |
| 6,978,419 B1 | 12/2005 | Kantrowitz |
| 6,980,984 B1 | 12/2005 | Huffman et al. |
| 7,051,044 B1* | 5/2006 | Fera ................ B61L 27/0094 |
| 7,168,039 B2 | 1/2007 | Bertram |
| 7,218,974 B2* | 5/2007 | Rumi ................ G05B 13/0275 318/561 |
| 7,461,077 B1 | 12/2008 | Greenwood |
| 7,567,844 B2* | 7/2009 | Thomas ................ G05B 15/02 348/143 |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Ruknoic et al. |
| 8,744,890 B1 | 6/2014 | Bernier |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0007225 A1* | 1/2002 | Costello ................ B61K 13/00 700/99 |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0126102 A1 | 7/2003 | Borthwick |
| 2003/0208706 A1* | 11/2003 | Roddy ................ H04L 1/22 714/48 |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2005/0171661 A1* | 8/2005 | Abdel-Malek ...... B61L 27/0094 701/31.4 |
| 2005/0192678 A1* | 9/2005 | May ................ G06F 11/0742 700/9 |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0192122 A1 | 8/2007 | Routson et al. |
| 2007/0208434 A1* | 9/2007 | Yeh ................ G05B 23/0264 700/9 |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone et al. |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed et al. |
| 2009/0157732 A1 | 6/2009 | Hao et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0095158 A1* | 4/2010 | Shah-Hosseini .... G06F 16/2465 714/37 |
| 2010/0098318 A1 | 4/2010 | Anderson |
| 2010/0106752 A1 | 4/2010 | Eckardt et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett et al. |
| 2010/0293397 A1* | 11/2010 | Pham ................ F04B 49/065 713/300 |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |

(56) References Cited

U.S. PATENT DOCUMENTS

| | | | |
|---|---|---|---|
| 2011/0302092 A1* | 12/2011 | Basir | G06Q 10/20 705/305 |
| 2011/0314007 A1 | 12/2011 | Dassa et al. | |
| 2011/0314024 A1 | 12/2011 | Chang et al. | |
| 2012/0004904 A1 | 1/2012 | Shin et al. | |
| 2012/0011238 A1 | 1/2012 | Rathod | |
| 2012/0011245 A1 | 1/2012 | Gillette et al. | |
| 2012/0022945 A1 | 1/2012 | Falkenborg et al. | |
| 2012/0054284 A1 | 3/2012 | Rakshit | |
| 2012/0059853 A1 | 3/2012 | Jagota | |
| 2012/0066166 A1 | 3/2012 | Curbera et al. | |
| 2012/0079363 A1 | 3/2012 | Folting et al. | |
| 2012/0084117 A1 | 4/2012 | Tavares et al. | |
| 2012/0084287 A1 | 4/2012 | Lakshminarayan et al. | |
| 2012/0089606 A1 | 4/2012 | Eshwar et al. | |
| 2012/0131512 A1 | 5/2012 | Takeuchi et al. | |
| 2012/0144335 A1 | 6/2012 | Abeln et al. | |
| 2012/0158527 A1 | 6/2012 | Cannelongo et al. | |
| 2012/0159362 A1 | 6/2012 | Brown et al. | |
| 2012/0173381 A1 | 7/2012 | Smith | |
| 2012/0215784 A1 | 8/2012 | King et al. | |
| 2012/0221553 A1 | 8/2012 | Wittmer et al. | |
| 2012/0226523 A1 | 9/2012 | Weiss | |
| 2012/0245976 A1 | 9/2012 | Kumar et al. | |
| 2012/0323888 A1 | 12/2012 | Osann, Jr. | |
| 2013/0016106 A1 | 1/2013 | Yip et al. | |
| 2013/0054306 A1 | 2/2013 | Bhalla | |
| 2013/0055145 A1 | 2/2013 | Antony et al. | |
| 2013/0057551 A1 | 3/2013 | Ebert et al. | |
| 2013/0096988 A1 | 4/2013 | Grossman et al. | |
| 2013/0110746 A1 | 5/2013 | Ahn | |
| 2013/0151453 A1 | 6/2013 | Bhanot et al. | |
| 2013/0166348 A1 | 6/2013 | Scotto | |
| 2013/0166480 A1 | 6/2013 | Popescu et al. | |
| 2013/0185245 A1 | 7/2013 | Anderson | |
| 2013/0185307 A1 | 7/2013 | Ei-Yaniv et al. | |
| 2013/0203400 A1* | 8/2013 | Ricci | G06F 13/14 455/418 |
| 2013/0218879 A1 | 8/2013 | Park et al. | |
| 2013/0226318 A1 | 8/2013 | Procyk | |
| 2013/0238616 A1 | 9/2013 | Rose et al. | |
| 2013/0246170 A1 | 9/2013 | Gross et al. | |
| 2013/0246537 A1 | 9/2013 | Gaddala | |
| 2013/0246597 A1 | 9/2013 | Iizawa et al. | |
| 2013/0263019 A1 | 10/2013 | Castellanos et al. | |
| 2013/0268520 A1 | 10/2013 | Fisher et al. | |
| 2013/0282696 A1 | 10/2013 | John et al. | |
| 2013/0290825 A1 | 10/2013 | Arndt et al. | |
| 2013/0297619 A1 | 11/2013 | Chandrasekaran et al. | |
| 2013/0304770 A1 | 11/2013 | Boero et al. | |
| 2013/0318604 A1 | 11/2013 | Coates et al. | |
| 2014/0012796 A1 | 1/2014 | Petersen et al. | |
| 2014/0040371 A1 | 2/2014 | Gurevich et al. | |
| 2014/0053091 A1 | 2/2014 | Hou et al. | |
| 2014/0058914 A1 | 2/2014 | Song et al. | |
| 2014/0068487 A1 | 3/2014 | Steiger et al. | |
| 2014/0074409 A1* | 3/2014 | Boyd | G06F 11/3013 702/35 |
| 2014/0095509 A1 | 4/2014 | Patton | |
| 2014/0108380 A1 | 4/2014 | Gotz et al. | |
| 2014/0108985 A1 | 4/2014 | Scott et al. | |
| 2014/0123279 A1 | 5/2014 | Bishop et al. | |
| 2014/0136285 A1 | 5/2014 | Carvalho | |
| 2014/0143009 A1 | 5/2014 | Brice et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0189870 A1 | 7/2014 | Singla et al. | |
| 2014/0195515 A1 | 7/2014 | Baker et al. | |
| 2014/0222521 A1 | 8/2014 | Chait | |
| 2014/0222793 A1 | 8/2014 | Sadkin et al. | |
| 2014/0229554 A1 | 8/2014 | Grunin et al. | |
| 2014/0280056 A1 | 9/2014 | Kelly | |
| 2014/0282160 A1 | 9/2014 | Zarpas | |
| 2014/0344230 A1 | 11/2014 | Krause et al. | |
| 2014/0358829 A1 | 12/2014 | Hurwitz | |
| 2014/0366132 A1 | 12/2014 | Stiansen et al. | |
| 2015/0073929 A1 | 3/2015 | Psota et al. | |
| 2015/0073954 A1 | 3/2015 | Braff | |
| 2015/0095773 A1 | 4/2015 | Gonsalves et al. | |
| 2015/0100897 A1 | 4/2015 | Sun et al. | |
| 2015/0106170 A1 | 4/2015 | Bonica | |
| 2015/0106379 A1 | 4/2015 | Elliot et al. | |
| 2015/0134599 A1 | 5/2015 | Banerjee et al. | |
| 2015/0135256 A1 | 5/2015 | Hoy et al. | |
| 2015/0188872 A1 | 7/2015 | White | |
| 2015/0242401 A1 | 8/2015 | Liu | |
| 2015/0338233 A1 | 11/2015 | Cervelli et al. | |
| 2015/0379413 A1 | 12/2015 | Robertson et al. | |
| 2016/0004764 A1 | 1/2016 | Chakerian et al. | |
| 2016/0180557 A1 | 6/2016 | Yousaf et al. | |
| 2016/0189440 A1* | 6/2016 | Cattone | G07C 5/008 701/31.5 |
| 2016/0210569 A1* | 7/2016 | Enck | G06Q 10/0637 |
| 2017/0052536 A1* | 2/2017 | Warner | G06Q 10/06312 |
| 2017/0263060 A1* | 9/2017 | Sukumaran | G07C 5/0808 |
| 2018/0060149 A1* | 3/2018 | Flyax | G06F 11/3058 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |
| WO | WO 2012/061162 | 5/2012 |

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP BusinessObjects Explorer Online Help," Mar. 19, 2012, retrieved on Apr. 21, 2016 http://help.sap.com/businessobject/product_guides/boexir4/en/xi4_exp_user_en.pdf.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

(56) References Cited

OTHER PUBLICATIONS

Distimo—App Analytics, <http://www.distimo.com/app-analytics> Printed Jul. 18, 2013 in 5 pages.
Flurry Analytics, <http://www.flurry.com/> Printed Jul. 18, 2013 in 14 pages.
Gill et al., "Computerised Linking of Medical Records: Methodological Guidelines."
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/483,527 dated Apr. 29, 2016.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/858,647 dated Mar. 4, 2016.
Official Communication for European Patent Application No. 14187996.5 dated Feb. 12, 2015.
Official Communication for European Patent Application No. 14187996.5 dated Feb. 19, 2016.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 15200073.3 dated Mar. 30, 2016.
Official Communication for European Patent Application No. 15201924.6 dated Apr. 25, 2016.
Official Communication for European Patent Application No. 16152984.7 dated Mar. 24, 2016.
Official Communication for Great Britain Patent Application No. 1404499.4 dated Sep. 29, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404489.5 dated Oct. 6, 2014.
Official Communication for Great Britain Patent Application No. 1404499.4 dated Jun. 11, 2015.
Official Communication for Great Britain Patent Application No. 1404486.1 dated Aug. 27, 2014.
Official Communication for Great Britain Patent Application No. 1404486.1 dated May 21, 2015.
Official Communication for Great Britain Patent Application No. 1404499.4 dated Aug. 20, 2014.
Official Communication for Netherlands Patent Application No. 2012417 dated Sep. 18, 2015.
Official Communication for Netherlands Patent Application No. 2012438 dated Sep. 21, 2015.
Official Communication for Netherlands Patent Application No. 2012421 dated Sep. 18, 2015.
Official Communication for New Zealand Patent Application No. 622513 dated Apr. 3, 2014.
Official Communication for New Zealand Patent Application No. 622473 dated Mar. 27, 2014.
Official Communication for New Zealand Patent Application No. 622473 dated Jun. 19, 2014.
Official Communication for New Zealand Patent Application No. 628161 dated Aug. 25, 2014.
Official Communication for U.S. Appl. No. 13/827,491 dated Oct. 9, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 14/141,252 dated Oct. 8, 2015.
Official Communication for U.S. Appl. No. 14/141,252 dated Apr. 14, 2016.
Official Communication for U.S. Appl. No. 14/225,006 dated Dec. 21, 2015.
Official Communication for U.S. Appl. No. 14/225,006 dated Sep. 2, 2015.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Feb. 26, 2016.
Official Communication for U.S. Appl. No. 14/225,084 dated Feb. 20, 2015.
Official Communication for U.S. Appl. No. 14/225,084 dated Sep. 11, 2015.
Official Communication for U.S. Appl. No. 14/225,084 dated Jan. 4, 2016.
Official Communication for U.S. Appl. No. 14/225,084 dated Sep. 2, 2014.
Official Communication for U.S. Appl. No. 14/225,160 dated Apr. 22, 2016.
Official Communication for U.S. Appl. No. 14/225,160 dated May 20, 2015.

(56) References Cited

OTHER PUBLICATIONS

Official Communication for U.S. Appl. No. 14/225,160 dated Aug. 12, 2015.
Official Communication for U.S. Appl. No. 14/225,160 dated Jun. 16, 2016.
Official Communication for U.S. Appl. No. 14/225,160 dated Jan. 25, 2016.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/225,160 dated Feb. 11, 2015.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Jan. 28, 2015.
Official Communication for U.S. Appl. No. 14/463,615 dated May 21, 2015.
Official Communication for U.S. Appl. No. 14/463,615 dated Nov. 13, 2014.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Oct. 28, 2015.
Official Communication for U.S. Appl. No. 14/483,527 dated Jan. 28, 2015.
Official Communication for U.S. Appl. No. 14/483,527 dated Jun. 22, 2015.
Official Communication for U.S. Appl. No. 14/552,336 dated Jul. 20, 2015.
Official Communication for U.S. Appl. No. 14/562,524 dated Sep. 14, 2015.
Official Communication for U.S. Appl. No. 14/562,524 dated Nov. 10, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated May 25, 2016.
Official Communication for U.S. Appl. No. 14/929,584 dated Feb. 4, 2016.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
Sigrist, et al., "Prosite, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): Wirn Vietri 2002, LNCS 2486, pp. 3-20.
Vose et al., "Help File for ModelRisk Version 5," 2007, Vose Software, pp. 349-353. [Uploaded in 5 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

\* cited by examiner

SYSTEMS AND METHODS FOR PROVIDING FAULT ANALYSIS USER INTERFACE

CROSS REFERENCE TO RELATED APPLICATIONS

This application claims the benefit under 35 U.S.C. § 119(e) of the U.S. Provisional Application Ser. No. 62/513,174, filed May 31, 2017, the content of which is hereby incorporated by reference in its entirety.

FIELD OF THE INVENTION

This disclosure relates to approaches for presenting a user interface for fault analysis.

BACKGROUND

Under conventional approaches, information about faults (e.g., mechanical faults, electronic faults, software errors) of a machine may be exchanged between different systems and/or recorded. Information about faults may be stored in a database, which may allow a technician to review the faults. However, existing interfaces are cumbersome and only provide limited views of the faults. As a result, analysis of the faults may be time consuming and/or inaccurate.

SUMMARY

Various embodiments of the present disclosure may include systems, methods, and non-transitory computer readable media configured to present a user interface for fault analysis. Various embodiments of the present disclosure may include systems, methods, and non-transitory computer readable media configured to access fault information. The fault information may identify faults for one or more machines. A fault analysis interface may be provided. The fault analysis interface may include an organization view, an instance view, a subsystem view, or a map view. The fault analysis interface may enable presentation of the organization view, the instance view, the subsystem view, and the map view. The fault analysis interface may display correlations of the faults using visuals and spatial locations of the visuals.

In some embodiments, the machine(s) may include one or more vehicles.

In some embodiments, the fault information may include system level fault information, message level fault information, and maintenance level fault information.

In some embodiments, the organization view may display the correlations of the faults based on groupings of the machine(s). The organization view may include visuals separated based on identifications of the machine(s), identifications of groups to which the machine(s) belong, and timings of occurrences of the faults.

In some embodiments, the instance view may display the correlations of the faults for an instance of use (e.g., a trip, a session) of a single machine. The instance view may include visuals separated based on identifications of the faults and timings of occurrences of the faults. The instance view may display the correlations of the faults using one or more colors.

In some embodiments, the subsystem view may display the correlations of the faults for a subsystem of the machine(s). The displayed faults may be associated with one or more of the machine(s) that have experienced a disabled status (e.g., grounded) during a time period. The subsystem view may include visuals separated based on timings of occurrences of the faults.

In some embodiments, the map view may display the correlations of the faults based on locations of the machine(s) during occurrences of the faults. The map view may include visuals separated based on the locations of the machine(s) during the occurrences of the faults. The map view may provide a heatmap of the occurrences of the faults. The map view may display route(s) taken by the machine(s), and may indicate where on the route(s) the faults occurred.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a system may access fault information identifying faults for one or more machines. In some embodiments, the machine(s) may include vehicles (e.g., trucks, ships). The fault information may include system level fault information (e.g., low level system messages), message level fault information (e.g., error messages shown to operators of the machine), and maintenance level fault information (e.g., interruption logs, maintenance logs, technical support logs). The system may provide a fault analysis interface that displays correlations of the faults using visuals (e.g., different shape, color, size) and spatial locations of the visuals. The fault analysis interface may include/enable presentation of an organization view, an instance view, a subsystem view, and/or a map view. Users may use the fault analysis interface to identify one or more faults for further review (e.g., based on correlation to other faults, based on number of occurrences within a time period/ different machines). Users may use the fault analysis interface to identify fault(s) of the machine(s) that are indicative of potentially costly (e.g., time and/or money) issue with the same machine(s) and/or different machine(s). The identified fault(s) may be used to provide/recommend preventative maintenance for the same machine(s) and/or different machine(s).

The approach disclosed herein provides a toolset to support preventative maintenance of one or more machines. Displaying correlations of faults using visuals and spatial locations of visuals may enable a user to identify one or more faults for further review and/or to provide/recommend preventative maintenance for one or more machines. The approach disclosed herein accelerates resolution of faults for machines, from discovery of faults to their mitigation/resolution, through early detection of faults and analysis of potential costs associated with repair/non-repair of the faults. The approach disclosed herein enables discovery and mitigation of faults across multiple machines (e.g., a fleet of machines) and provides for accelerated resolution/root cause analysis by providing tools to enhance collaboration among multiple users/groups.

Figure 1:
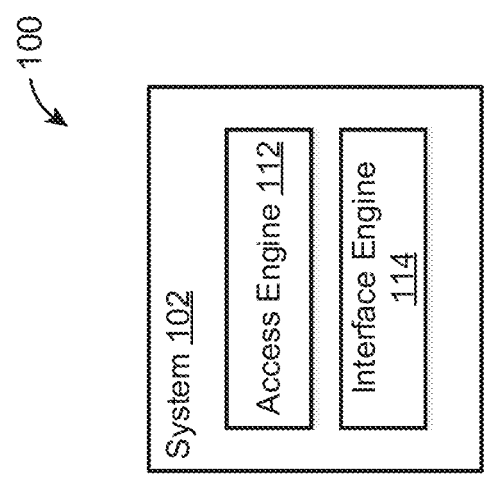
FIG. 1 illustrates an example environment for presenting a user interface for fault analysis, in accordance with various embodiments.

FIG. 1 illustrates an example environment 100 for presenting a user interface for fault analysis, in accordance with various embodiments. The example environment 100 may include a computing system 102. The computing system 102 may include one or more processors and memory. The processor(s) may be configured to perform various operations by interpreting machine-readable instructions stored in the memory. As shown in FIG. 1, in various embodiments, the computing device 102 may include an access engine 112, an interface engine 114, and/or other engines.

In various embodiments, the access engine 112 is configured to access fault information. Fault information may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Fault information may be stored in one or more databases. Fault information may be stored within a single file or across multiple files.

Fault information may identify faults for one or more machines. A fault may refer to deviation from specification(s), standard(s), expectation(s), and/or requirement(s) for operations of commercial or consumer machines, electronics, mechanical apparatus, and/or other machines. For example, a fault may refer to a problem with operation of a vehicle (e.g., trucks, ships). Faults may include mechanical faults, electronical faults, software errors, and/or other faults. A fault may occur during manufacture and/or operation of the machine. A fault may be manually or automatically recorded. For example, during or after a driving trip, a driver/mechanic of a truck may manually observe and record one or more faults with a truck. During or after the driving trip, one or more faults may be detected by one or more sensors within the truck and automatically recorded (e.g., as error codes, descriptions of faults) by a computing device within the truck. Other occurrences and recordations of faults are contemplated.

In some embodiments, the fault information may include system level fault information, message level fault information, maintenance level fault information, and/or other types of fault information. System level fault information may refer to fault information exchanged/recorded by one or more components/systems of a machine. For example, system level fault information may include fault information (e.g., error codes, descriptions of fault) exchanged between a sensor and a processor, between multiple processors, and/or recorded by a sensor/processor of the machine. Message level fault information may refer to fault information provided to one or more users (e.g., operators, engineers). For example, message level fault information of a truck may include fault information provided to a driver/mechanic of the truck during and/or after the operation of the truck. In some embodiments, message level fault information may be structured differently (e.g., include more user-friendly description of faults) than system level fault information. Maintenance level fault information may refer to fault information exchanged/recorded during maintenance of a machine. For example, maintenance level fault information may include one or more maintenance logs, interruption logs, technical support logs, communication logs, part removal/addition logs and/or other communications exchanged/recorded for a machine. Other types of fault information are contemplated.

In various embodiments, the interface engine 114 is configured to provide a fault analysis interface. The fault analysis interface may display correlations of the faults using visuals and spatial locations of the visuals. The fault analysis interface may include an organization view, an instance view, a subsystem view, and/or a map view. The fault analysis interface may enable presentation of the organization view, the instance view, the subsystem view, and/or the map view. In some embodiments, the fault analysis interface may provide other data related to a machine and/or faults. For example, the fault analysis interface may display/provide links to technical/maintenance manuals providing information regarding faults identified for a machine. The fault analysis interface may display/provide links to portions of the technical/maintenance manuals that relates to the faults identified for a machine. The outputs of the fault analysis interface (e.g., organization of faults, user selection of faults) may be provided to other systems to facilitate integration with other tools and/or to other users to facilitate collaboration among multiple users/groups (e.g., among different engineers/groups of engineers, among operators and engineers).

The fault analysis interface may include visuals representing individual faults and/or groupings of faults. One or more aspects of the visuals may be uniform across different faults/groupings of faults. One or more aspects of the visuals may be different across different faults/groupings of faults. For example, individual faults/groupings of faults may be displayed within the fault analysis interface using one or more same visual aspects (e.g., same shape, same color, same pattern, same size) or one or more different visual aspects (e.g., different shapes, different colors, different patterns, different sizes). Differences in the visual aspects of different faults may indicate one or more different characteristics of the faults.

The organization view may display the correlations of the faults based on groupings of machines. Multiple machines may be grouped together based on one or more common characteristics. For example, machines may be grouped together based on types of machines, manufactures of the machines (e.g., common manufacturing source, common serial number), ownerships/operators of the machines, operation types of the machines, operation locations of the machines, operation times of the machines, and/or other commonalities.

The organization view may separate the visuals representing faults/groupings of faults based on identifications of the machine(s), identifications of groups to which the machine(s) belong, and timings of occurrences of the faults. Visuals representing faults for a single machine may be displayed together (e.g., in a block, in a row, in a column). Visuals may be separated based on machines in which the faults were identified to provide correlations between the faults and the machines. Visuals representing faults for a group of machines may be displayed together (e.g., in a group of blocks, in a group of rows, in a group of columns). Visuals may be separated based on groups of machines in which the faults were identified to provide correlations between the faults and the groups of machines. Visuals may be presented in a given order based on timings of occurrences of the faults and/or within groups of time periods to provide correlations between the faults and the timings of occurrences of the faults.

The organization view may provide an interface through which a user may display/hide faults for particular machines/groupings of machine, change the time durations for which the faults are displayed, and/or highlight particular fault(s) across multiple machines/groups of machines. The organization view may provide an interface through which a user may view additional information about particular fault(s), particular machine(s), and/or particular group(s) of machines. The organization view may provide an interface through which a user may filter the displayed faults (e.g., based on particular faults, root cause, affected systems).

The organization view may enable identification of occurrence of a particular fault and/or groups of fault across a single machine, multiple machines, a single group of machine, or multiple groups of machines. The organization view may provide a view from which it may be determined whether the faults are appearing in particular machines, particular types of machines (e.g., machines of a particular build/having common manufacture), particular groups of machines (e.g., machines belonging to a particular company, machine assigned to a particular location, machines deployed at a particular time), different machines, different types of machines, or different groups of machines. The organization view may enable determination of whether a particular fault may be correlated with other faults (e.g., be the cause of, be caused by, or associated with other faults). The organization view may enable determination of patterns among faults across a single machine, multiple machines, a single group of machine, or multiple groups of machines.

The organization view may facilitate provision/recommendation of preventative maintenance for one or more machines/one or more groups of machines. The organization view may be used to analyze fault histories of machines to determine whether a severe fault could have been predicted/prevented based on one or more less severe faults. For example, the organization view may be used to analyze fault histories of machines to determine that a particular severe fault tends to be associated with one or more less severe faults that precedes the severe fault. Based on occurrences of these less severe faults indicative of a potentially more serious problem with a machine, preventative maintenance of machine(s) may be provided/recommended. For example, a particular severe fault may have led to breakdown/inoperability of a machine for a period of time. The severe fault may be associated with occurrences of one or more less severe faults within a given range of time preceding the occurrence of the severe fault. Based on repairs of the less severe fault(s) being less costly (e.g., in terms of time, personnel, money) than repairs of the severe fault, maintenance to address the less severe fault(s) and potentially prevent the severe fault may be provided/recommended. Other correlations/determinations based on visual representations of groupings of faults are contemplated.

The instance view may display the correlations of the faults for an instance of use of a machine. An instance of use may refer to a particular use of a machine that may be characterized as a "continuous" use of the machine. An instance of use may refer to a session of use (e.g., operating a machine for a defined duration of time/within a defined location, operating a machine periodically for a defined duration of time/within a defined location). For example, for a vehicle, an instance of use may refer to a single trip taken by the vehicle. The instance view may display the faults identified for the vehicle during a single trip taken by the vehicle. Other instances of use are contemplated.

The instance view may separate the visuals representing faults/groupings of faults based on identifications of the faults and timings of occurrences of the faults. Visuals may be separated based on individual identifications of faults to provide correlations between the faults and the instance of use/timing of use. Visuals may be separated based on when the faults occurred, and may be presented in a given order based on timings of occurrences of the faults to provide correlations between the faults and the timings of occurrences of the faults. The instance view may provide a timeline of faults identified for a machine during an instance of use of the machine. The instance view may provide an interface through which a user may view additional information about particular fault(s), the particular machine, or the particular instance of use. The instance view may provide an interface through which a user may filter the displayed faults (e.g., based on particular faults, root cause, affected systems).

The instance view may display one or more correlations of faults using one or more colors, patterns, shapes, and/or sizes. For example, the instance view may display a particular type of fault in a first color based on a user's selection of the particular type of fault. The instance view may display in a second color faults that are associated with the selected fault. The instance view may use other colors to display correlations/non-correlations between the faults. The instance view may provide context of the faults. For example, the instance view may provide visuals showing the locations of the faults in a machine and/or may separate visuals representing faults based on systems/sub-systems of the machine to which the faults relate/originate.

The instance view may enable identification of occurrences of particular faults that may be indicative of occurrences of other faults and/or provide context for occurrences of faults. For example, the instance view may be used to analyze a fault history of a machine during an instance of use to determine the timings associated with faults and determine correlations between different faults. The instance view may be used to identify the stages of operations associated with faults and facilitate locating the root cause of the faults. For example, particular faults for a vehicle may be regularly observed during particular phase(s) of a trip, and the operations of the vehicle during the particular phase(s) may be analyzed to help determine the cause of the faults. Other correlations/determinations based on visual representations of faults for an instance of use are contemplated.

The subsystem view may display the correlations of the faults for one or more subsystems of the machine(s). A subsystem may refer to a particular portion (e.g., mechanical, electrical, software) of the machine. A subsystem may include hardware and/or software of the machine. Visuals representing faults for the subsystem(s) may be separated based on timings of occurrences of the faults. Visuals may be separated based on when the faults occurred, and may be presented in a given order based on timings of occurrences of the faults to provide correlations between the faults and the timings of occurrences of the faults.

The faults displayed within the subsystem view may be associated with one or more machine(s) that have experienced a disabled status (e.g., grounded) during a time period. For example, the subsystem view may display the faults of particular subsystem(s) of one or more machines that have been disabled during a particular time period. The subsystem view may provide information relating to the faults (e.g., error code, error description, timing of faults, location of faults) and may allow for comparison of faults for particular subsystem(s), which may have contributed to a machine becoming disabled/inoperable. Other correlations/determinations based on visual representations of fault for subsystem(s) are contemplated.

The map view may display the correlations of the faults based on locations of the machine(s) during occurrences of the faults. The map view may provide information on where different machines were located when the faults occurred. The map view may separate the visuals representing faults based on the locations of the machine(s) during the occurrences of the faults. For example, the map view may provide information on a route taken by a truck during a delivery and may provide information on where on the route different faults were identified/recorded. The map view may display a map of an area traveled by the truck, overlay the route taken by the truck, and provide visuals that indicate occurrences of faults. In some embodiments, the map view may provide a heatmap of the occurrences of the faults. Heatmap may indicate via different visuals (e.g., different sizes of visuals, different colors/patterns of visuals) differences in faults occurrences, such as the difference in number and/or severity of faults occurring within particular region(s). The map view may enable a user to see timings of occurrences of the faults. The map view may enable a user to see different information about usage of the machine. For example, the map view may display a truck's delivery trip in different colors based on the amount/type of load carried by the truck. The map view may provide an interface through which faults may be filtered (e.g., via fault type, machine type, group type, time).

The map view may facilitate analysis of faults based on locations. The map view may facilitate determinations of correlations/associations between particular locations/characteristics of particular locations and particular faults. For example, based on occurrences of particular faults in hot/cold locations, determinations of correlations/association may be determined between the particular faults and temperature of operating conditions. As another example, based on occurrences of particular faults in locations with different protocols for operating the machines, determinations of correlations/association may be determined between the particular faults and operating protocols.

The map view may facilitate determinations of correlations/associations of faults further based on timing. For example, particular faults may be observed in locations where machines are in a particular operation status for a certain length of time. For example, particular faults may be observed in locations where machines have been operating for a given length of time or where the machine have been inactive for a given length of time. Other correlations/determinations based on visual representations of fault locations are contemplated.

FIGS. 2-5 illustrate example user interfaces 200, 300, 400, 500 for fault analysis, in accordance with various embodiments. In various embodiments, the user interfaces 200, 300, 400, 500 may be accessed through a software application running on a computing device (e.g., computers, mobile phones, tablets, etc.) that includes one or more processors and memory. For example, the user interfaces 200, 300, 400, 500 may be accessible through a web browser. In another example, the user interfaces 200, 300, 400, 500 may be provided through a data analysis application. In yet another example, the user interfaces 200, 300, 400, 500 may be provided as a service over a network (e.g., software as a service). Depending on the computing device, the user may be able to interact with the user interfaces 200, 300, 400, 500 using various input devices (e.g., keyboard, mouse, etc.) and/or touch gestures. The user interfaces 200, 300, 400, 500 are provided merely as examples and, naturally, the arrangement and configuration of such user interfaces can vary depending on the implementation. Thus, depending on the implementation, the user interfaces 200, 300, 400, 500 may include additional features and/or alternative features.

Figure 2:
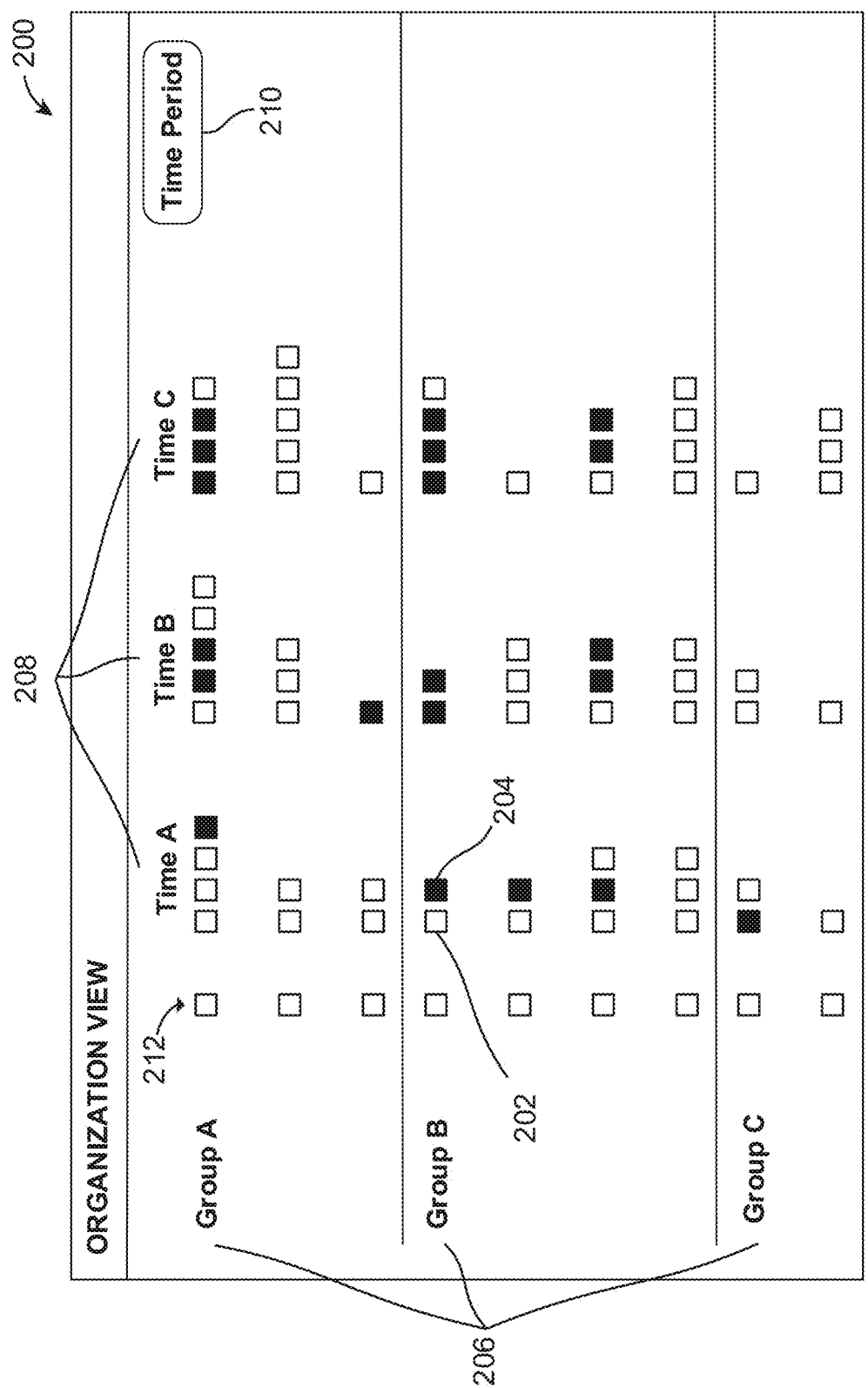
FIG. 2 illustrates an example organization view of a user interface, in accordance with various embodiments.

Referring to FIG. 2, the user interface 200 may include an example organization view for fault analysis. The user interface 200 may include visuals (e.g., visuals 202, 204) representing faults/groupings of faults. For example, the visuals may be shaped as squares as shown in FIG. 2. Other types, shapes, and sizes of visuals are contemplated. The user interface 200 may display correlations of faults based on groupings of machines. Multiple machines may be grouped together based on one or more common characteristics (e.g. types of machines, manufactures of the machines, ownerships/operators of the machines, operation types of the machines, operation locations of the machines, operation times of the machines). For example, multiple machines may be grouped into different groups 206 (Group A, Group B, Group C). Individuals rows of visuals within the groups 206 may correspond to individual machines. For example, visuals within a column 214 may individually represent a particular machine, and other visuals within the same row may individually represent faults/groups of faults for the particular machine.

The user interface 200 may separate the visuals representing faults/groupings of faults based on identifications of the machine(s), identifications of groups to which the machine(s) belong, and timings of occurrences of the faults. For example, visuals representing faults for a single machine may be displayed together in the same row. Visuals representing faults may be separated into different rows based on machines in which the faults were identified to provide correlations between the faults and the machines. Visuals representing faults for different groups of machines may be displayed together in groups of rows 206. Visuals may be separated based on groups of machines in which the faults were identified to provide correlations between the faults and the groups of machines. Visuals may be presented in a given order based on timings of occurrences of the faults and/or within groups of time periods to provide correlations between the faults and the timings of occurrences of the faults. For example, visuals may be presented within groups of time periods 208 (Time A, Time B, Time C) based on in which time periods 208 the faults occurred. The order in which the faults are displayed within individual time periods 208 may indicate the order in which the faults occurred within the time periods 208. The time periods for which the faults are displayed may be changed via interaction with a time period option 210. The time period option 210 may enable a user to select a particular time period for which the user interface 200 may display visuals representing faults. For example, the time period option 210 may enable a user to select a standard duration of time (e.g., daily view, weekly view, monthly view, yearly view) or a custom duration of time (e.g., between a first time/date and a second time/date).

The user interface 200 may enable a user to highlight particular fault(s) across multiple machines/groups of machines. For example, a user may have selected a fault corresponding to the visual 204. The user interface 200 may display the visual 204 differently (e.g., using different color) than the visuals representing other faults (e.g., the visual 202). The user interface 200 may display other visuals representing the same fault and/or related faults in the same manner as the visual 204 (e.g., using the same color as the visual 204). Referring to FIG. 2, a user's selection of a fault corresponding to the visual 204 may result in the user interface 200 highlighting other visuals representing the same fault in the same color. The user interface 200 may show that the particular fault occurred in two machines in Group A, in three machines in Group B, and one machine in Group C. The user interface 200 may show that three of the machines (one in Group A and two in Group B) appear to be more severely affected by this particular fault than other machines.

The user interface 200 may enable a user to view additional information about particular fault(s), particular machine(s), and/or particular group(s) of machines. For example, the user interface 200 may display additional information about the fault represented by the visual 204 based on a user's selection of the visual 204. The user interface 200 may display additional information about a particular machine based on a user's selection of a visual in column 212 corresponding to the particular machine. The user interface 200 may display additional information about particular groups of machines (e.g., Group A, Group B, Group C) based on a user's selection of visual(s) corresponding to particular group(s).

The user interface 200 may enable a user to filter the displayed faults. For example, the user interface 200 may include options through which a user may filter which faults (visuals representing faults) are displayed based on identification of particular faults, root cause, affected system, and/or other common characteristics. For example, the user interface 200 may enable a user to filter the displayed faults based on selection of the fault represented by the visual 204 so that the user interface displays only such faults, displays machines with such faults, and/or provides other filtered view based on such faults.

The user interface 200 may enable identification of occurrence of a particular fault and/or groups of fault across a single machine, multiple machines, a single group of machine, or multiple groups of machines. The user interface 200 may provide a view from which it may be determined whether the faults are appearing in particular machines, particular types of machines (e.g., machines of a particular build/having common manufacture), particular groups of machines (e.g., machines belonging to a particular company, machine assigned to a particular location, machines deployed at a particular time), different machines, different types of machines, or different groups of machines. The user interface 200 may enable determination of whether a particular fault may be correlated with other faults (e.g., be the cause of, be caused by, or associated with other faults). The user interface 200 may enable determination of patterns among faults across a single machine, multiple machines, a single group of machine, or multiple groups of machines.

The user interface 200 may facilitate provision/recommendation of preventative maintenance for one or more machines/one or more groups of machines. The user interface 200 may be used to analyze fault histories of machines to determine whether a severe fault could have been predicted/prevented based on one or more less severe faults. For example, the user interface 200 may be used to analyze fault histories of machines to determine that a particular fault (e.g., a fault represented by the visual 204) tends to precedes more severe faults. For example, multiple occurrences of this particular fault within short durations of times may indicate that a particular subsystem/system of a machine may soon become disabled. Based on occurrences of visual patterns showing frequent occurrences of this fault (e.g., as shown for the first machine within Group A, and the first and third machines within Group B), preventative maintenance of machine(s) may be provided/recommended. Based on repairs of the identified faults/associated faults being less costly (e.g., in terms of time, personnel, money) than repairs of the subsystem/system after it becomes disabled, maintenance to address the identified faults and potentially prevent the disablement of the subsystem may be provided/recommended. Other correlations/determinations based on visual representations of faults within the user interface 200 are contemplated.

Figure 3:
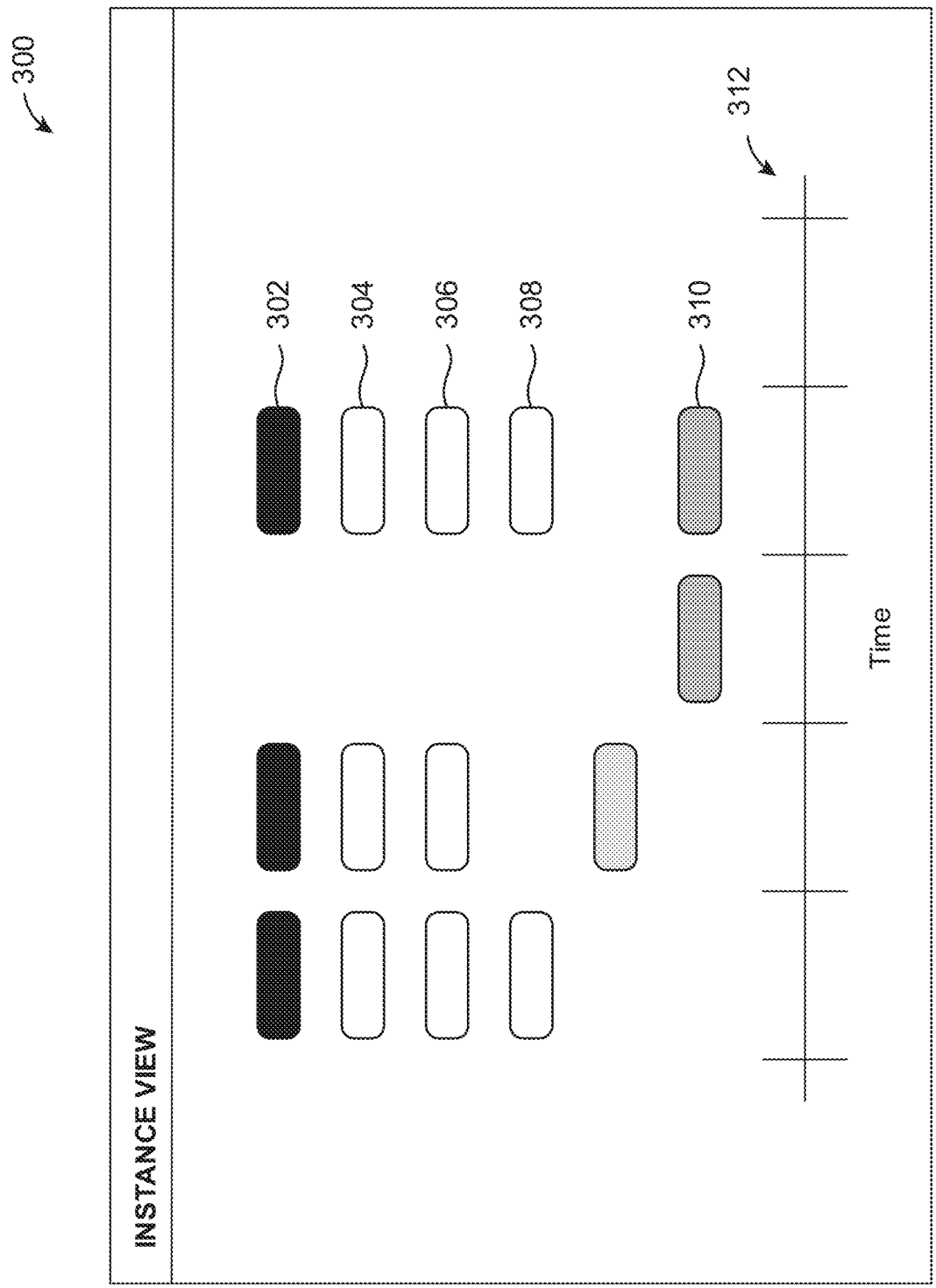
FIG. 3 illustrates an example instance view of a user interface, in accordance with various embodiments.

Referring to FIG. 3, the user interface 300 may include an example instance view for fault analysis. The user interface 300 may include visuals (e.g., visuals 302, 304, 306, 308) representing faults/groupings of faults. For example, the visuals may be shaped as rounded rectangles as shown in FIG. 3. Other types, shapes, and sizes of visuals are contemplated. The user interface 300 may display the correlations of the faults for an instance of use of a machine. An instance of use may refer to a particular use of the machine that may be characterized as a "continuous" use of the machine. An instance of use may refer to a session of use (e.g., operating a machine for a defined duration of time/ within a defined location, operating a machine periodically for a defined duration of time/within a defined location). For example, for a vehicle, an instance of use may refer to a single trip taken by the vehicle. The user interface 300 may display the faults identified for the vehicle during a single trip taken by the vehicle.

The user interface 300 may separate the visuals representing faults/groupings of faults based on identifications of the faults and timings of occurrences of the faults. Visuals may be separated based on individual identifications of faults to provide correlations between the faults and the instance of use/timing of use. For example, individual visuals 302, 304, 306, 308, 310 may identify individual occurrences of faults. Visuals may be separated based on when the faults occurred, and may be presented in a given order based on timings of occurrences of the faults to provide correlations between the faults and the timings of occurrences of the faults. For example, the visual may be separated based on time durations (e.g., as indicated by a time indicator 312) in which the faults occurred. For example, the faults represented by the visuals 302, 304, 306, 308, 310 may have occurred during a single time duration. The user interface 300 may provide a timeline of faults identified for a machine during an instance of use of the machine.

The user interface 300 may enable a user to view additional information about particular fault(s), the particular machine, or the particular instance of use. For example, the user interface 300 may include options (e.g., visuals such as the visuals 302, 304, 306, 308) which may be selected by a user to view additional information about faults, machines, and/or instance of use. The user interface 300 may enable a user to filter the displayed faults (e.g., based on particular faults, root cause, affected systems). For example, the user interface 300 may include options through which a user may filter which faults (visuals representing faults) are displayed based on identification of particular faults, root cause, affected system, and/or other common characteristics.

The user interface 300 may display one or more correlations of faults using one or more colors, patterns, shapes, and/or sizes. For example, the user interface 300 may display a particular type of fault in a first color (e.g., shown with respect to the visual 302) based on a user's selection of the particular type of fault. The user interface 300 may display in a second color (e.g., shown with respect to the visual 310) faults that are associated with the selected fault. The user interface 300 may use other colors to display correlations/non-correlations between the faults. For example, a particular color or a lack of color (e.g., shown with respect to the visuals 304, 306, 308) may indicate that the faults represented by the visuals are not correlated to the selected fault. The user interface 300 may provide context of the faults. For example, the user interface 300 may provide visuals showing the locations of the faults in a machine and/or may separate visuals representing faults based on systems/sub-systems of the machine to which the faults relate/originate. For example, individual rows of visuals shown within the user interface 300 may correspond to faults that occurred within different systems/sub-systems of the machine.

The user interface 300 may enable identification of occurrences of particular faults that may be indicative of occurrences of other faults and/or provide context for occurrences of faults. For example, the user interface 300 may be used to analyze a fault history of a machine during an instance of use to determine the timings associated with faults and determine correlations between different faults. The user interface 300 may be used to identify the stages of operations associated with faults and facilitate locating the root cause of the faults. For example, particular faults for a vehicle may be regularly observed during particular phase(s) of a trip, and the operations of the vehicle during the particular phase(s) may be analyzed to help determine the cause of the faults. Other correlations/determinations based on visual representations of faults for an instance of use are contemplated.

Figure 4:
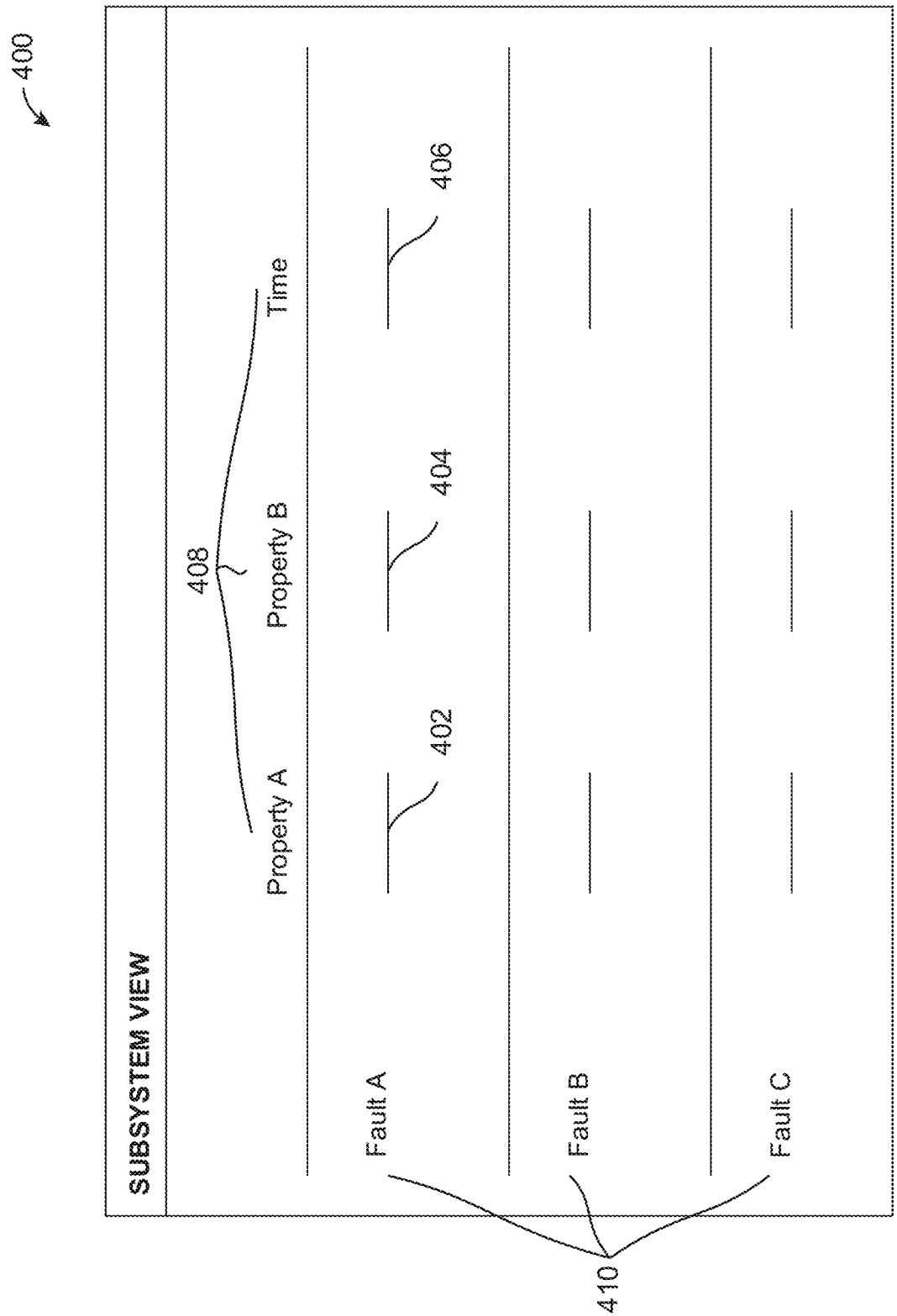
FIG. 4 illustrates an example subsystem view of a user interface, in accordance with various embodiments.

Referring to FIG. 4, the user interface 400 may include an example subsystem view for fault analysis. The user interface 400 may include visuals (e.g., visuals 402, 404, 406) representing faults/groupings of faults. The visuals may include particular shapes and/or colors, and/or descriptions of the fault (e.g., error code, string of text). Other types, shapes, and sizes of visuals are contemplated. The user interface 400 may display the correlations of the faults for one or more subsystems of the machine(s). A subsystem may refer to a particular portion (e.g., mechanical, electrical, software) of the machine. A subsystem may include hardware and/or software of the machine. Visuals representing faults for the subsystem(s) may be separated based on timings of occurrences of the faults. For example, visuals representing faults 410 may be sorted based on timings of occurrences of the faults. Visuals may be separated based on when the faults occurred, and may be presented in a given order based on timings of occurrences of the faults to provide correlations between the faults and the timings of occurrences of the faults.

The faults displayed within the user interface 400 may be associated with one or more machine(s) that have experienced a disabled status (e.g., grounded) during a time period. For example, the user interface 400 may display the faults of particular subsystem(s) of one or more machines that have been disabled during a particular time period. The user interface 400 may provide information relating to the faults (e.g., error code, error description, timing of faults, location of faults) and may allow for comparison of faults for particular subsystem(s), which may have contributed to a machine becoming disabled/inoperable. For example, the user interface 400 may include visuals (e.g., error codes, descriptions) of properties/times 408 for individual faults displayed within the user interface 400. Other correlations/determinations based on visual representations of fault for subsystem(s) are contemplated.

Figure 5:
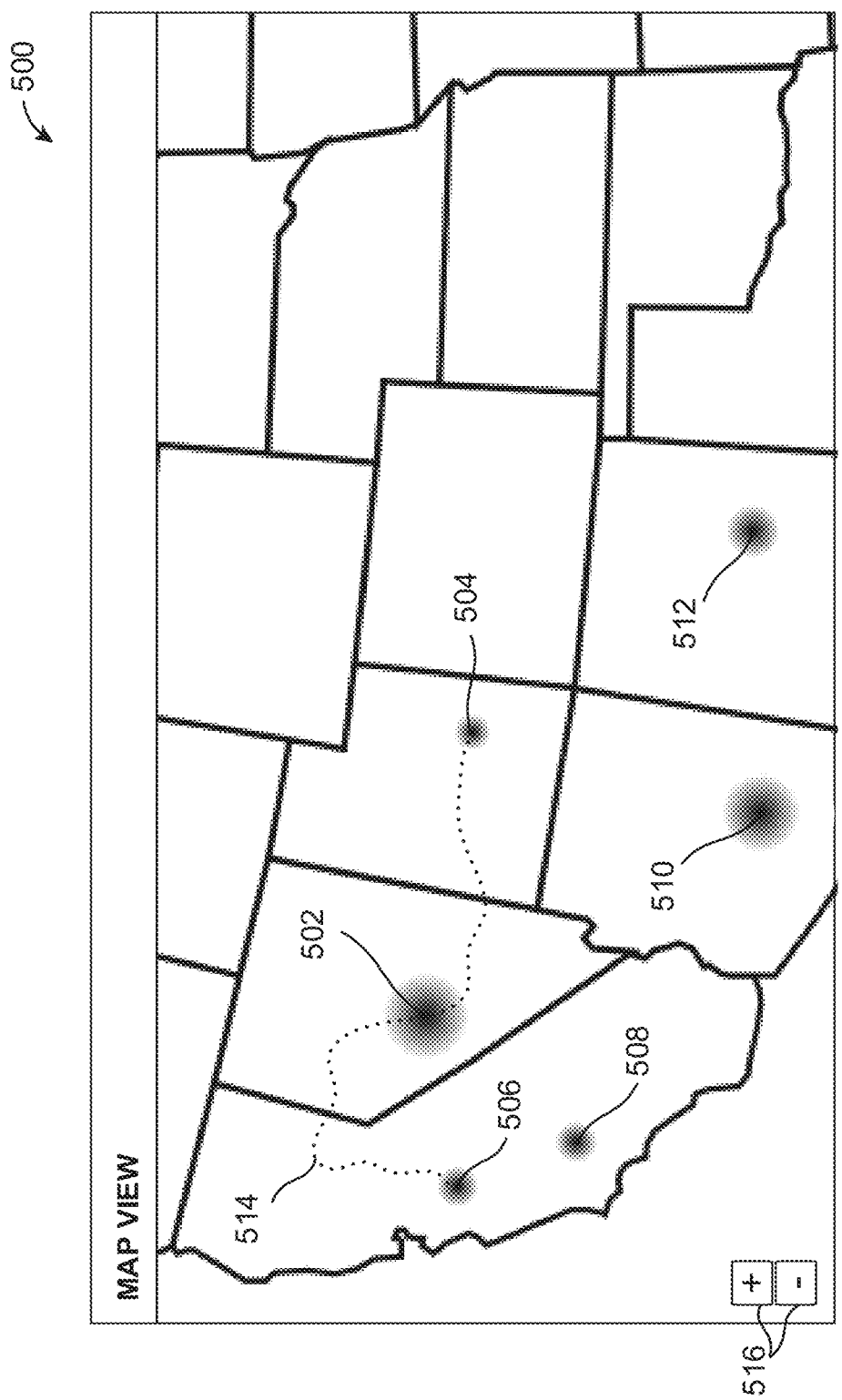
FIG. 5 illustrates an example map view of a user interface, in accordance with various embodiments.

Referring to FIG. 5, the user interface 500 may include an example map view for fault analysis. The user interface 500 may include visuals (e.g., visuals 502, 504, 506, 508, 510, 512) representing faults/groupings of faults. For example, the visuals may be shaped as circles of different sizes as shown in FIG. 2. Other types, shapes, and sizes of visuals are contemplated. The user may change the extent of the area shown within the user interface (e.g., via panning the view, changing the level of zoom using zoom options 516).

The user interface 500 may display the correlations of the faults based on locations of the machine(s) during occurrences of the faults. The user interface 500 may provide information on where different machines were located when the faults occurred. For example, for individual faults, the user interface 500 may display a visual to represent the fault at the location of occurrence. The user interface 500 may separate the visuals representing faults based on the locations of the machine(s) during the occurrences of the faults.

In some embodiments, the user interface 500 may provide a heatmap of the occurrences of the faults. A heatmap may indicate via different visuals (e.g., different sizes of visuals, different colors/patterns of visuals) differences in faults occurrences, such as the difference in the number and/or severity of faults occurring within particular region(s). For example, referring to the example view shown in FIG. 5, the size of visuals 502, 510 may indicate that the locations corresponding to the faults represented by the visuals 502, 510 are associated with greater number/more severe faults than locations corresponding to other faults represented by the visuals 504, 506, 508, 512.

The user interface 500 may enable a user to see timings of occurrences of the faults. For example, responsive to a user's click or hovering over a particular visual, the user interface may display the times when the corresponding faults occurred. The user interface 500 may enable a user to see different information about usage of the machine(s). For example, the user interface 500 may display a truck's delivery trip (e.g., along a route 514) in different colors based on the amount/type of load carried by the truck. The user interface 500 may include a region displaying information specific to one or more faults, machines, locations, and/or instances of use. The user interface 500 may enable a user to filter the types of faults displayed, for example, based on fault type, machine type, group type, time of occurrence, and/or other information.

In some embodiments, the user interface 500 may provide information on the route 514 (e.g., overlaid over a map)

taken by a truck during a delivery and may provide information on where on the route 514 different faults 502, 504, 506 were identified/recorded. The user interface 500 may display a map of an area traveled by the truck, overlay the route 514 taken by the truck, and provide visuals that indicate occurrences of faults 502, 504, 506. For example, referring to the example view shown in FIG. 5, a truck may have traveled the route 514 by leaving from a location corresponding to the visual 504 and arriving at a location corresponding to the visual 506. The truck may have experienced faults/may have faults recorded/observed at the point of departure (represented by the visual 504), the point of arrival (represented by the visual 506), and at a location along the route 514 (represented by the visual 502).

The user interface 500 may facilitate analysis of faults based on locations. The user interface 500 may facilitate determinations of correlations/associations between particular locations/characteristics of particular locations and particular faults. For example, based on occurrences of particular faults in hot/cold locations, determinations of correlations/association may be determined between the particular faults and temperature of operating conditions. As another example, based on occurrences of particular faults in locations with different protocols for operating the machines, determinations of correlations/association may be determined between the particular faults and operating protocols.

The user interface 500 may facilitate determinations of correlations/associations of faults further based on timing. For example, particular faults may be observed in locations where machines are in a particular operation status for a certain length of time. For example, particular faults may be observed in locations where machines have been operating for a given length of time or where the machine have been inactive for a given length of time. Other correlations/determinations based on visual representations of fault locations are contemplated.

Figure 6:
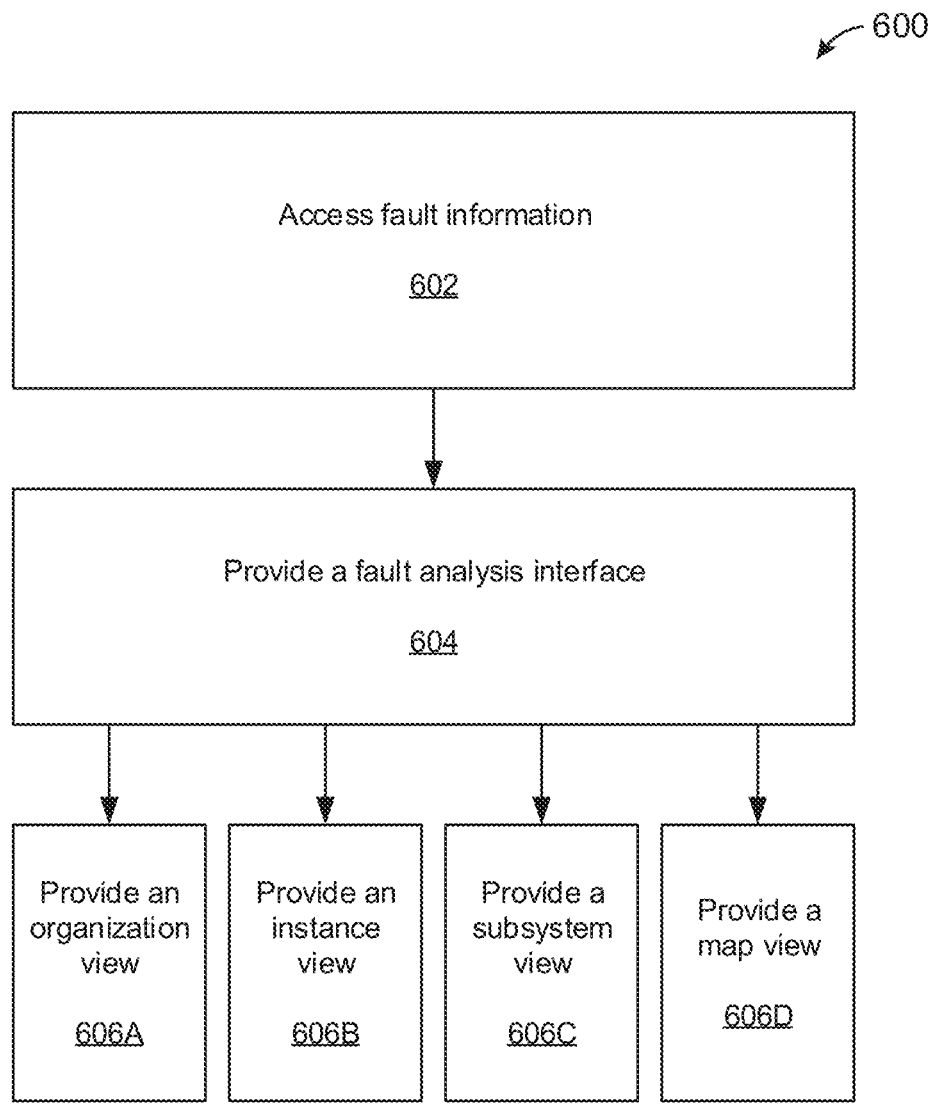
FIG. 6 illustrates a flowchart of an example method, in accordance with various embodiments.

FIG. 6 illustrates a flowchart of an example method 600, according to various embodiments of the present disclosure. The method 600 may be implemented in various environments including, for example, the environment 100 of FIG. 1. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 602, fault information may be accessed. The fault information may identify faults for one or more machines. At block 604, a fault analysis interface may be provided. The fault analysis interface may display correlations of the faults using visuals and spatial locations of the visuals. At block 606A, an organization view of the fault analysis interface may be provided. At block 606B, an instance view of the fault analysis interface may be provided. An block 606C, a subsystem view of the fault analysis interface may be provided. At block 606D, a map view of the fault analysis interface may be provided.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
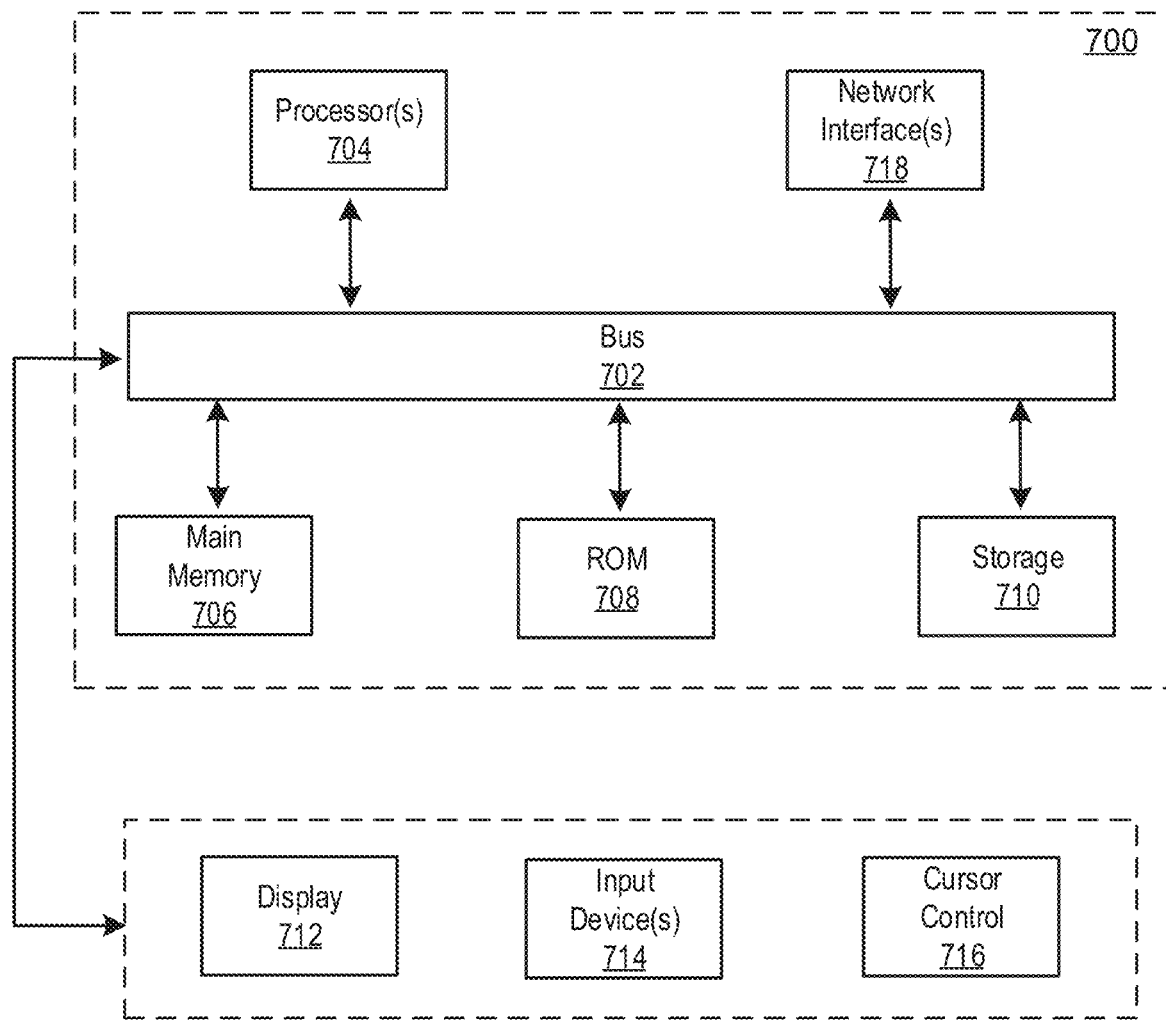
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors;
   memory storing instructions that, when executed by the one or more processors, cause the system to perform:
      accessing fault information, the fault information identifying faults for one or more machines; and
      providing a fault analysis interface, the fault analysis interface including a map view and an organization view, the fault analysis interface displaying correlations of the faults using visuals and spatial locations of the visuals, the map view displaying the correlations of the faults based on geographic locations of the one or more machines during occurrences of the faults, the map view indicating a respective severity of each of the faults within different geographic regions including the geographic locations, wherein each of the respective severities is based on a relative potential cost associated with the corresponding fault, and the organization view providing an analysis of a history of the faults to determine whether one of the faults could have been predicted or prevented based on an occurrence of one or more less severe faults compared to the one of the faults.

2. The system of claim 1, wherein the organization view displays the correlations of the faults based on groupings of the one or more machines, the organization view including the visuals separated based on identifications of the one or more machines, identifications of groups to which the one or more machines belong, and timings of occurrences of the faults, and the instructions further cause the system to perform:
   in response to a fault occurring, providing a recommendation of maintenance based on a correlation between the fault and a more severe fault, compared to the fault, that could be prevented by the maintenance, and based on a relative cost of the maintenance.

3. The system of claim 1, wherein the fault analysis interface includes an instance view, the instance view displaying the correlations of the faults for an instance of use of a single machine, the instance view including the visuals separated based on identifications of the faults and timings of occurrences of the faults, wherein the instance view displays the correlations of the faults further using one or more colors.

4. The system of claim 1, wherein the fault analysis interface includes a subsystem view, the subsystem view displaying the correlations of the faults for a subsystem of the one or more machines, the displayed faults associated with one or more of the one or more machines that have experienced a disabled status during a time period, the subsystem view including the visuals separated based on timings of occurrences of the faults.

5. The system of claim 1, wherein the map view includes the visuals separated based on the locations of the one or more machines during the occurrences of the faults.

6. The system of claim 1, wherein the one or more machines include one or more vehicles.

7. The system of claim 1, wherein the fault information includes system level fault information, message level fault information, and maintenance level fault information.

8. A method implemented by a computing system including one or more processors and storage media storing machine-readable instructions, wherein the method is performed using the one or more processors, the method comprising:
   accessing fault information, the fault information identifying faults for one or more machines; and
   providing a fault analysis interface, the fault analysis interface including a map view and an organization view, the fault analysis interface displaying correlations of the faults using visuals and spatial locations of the visuals, the map view displaying the correlations of the faults based on geographic locations of the one or more machines during occurrences of the faults, the map view indicating a respective severity of each of the faults within different geographic regions including the geographic locations, wherein each of the respective severities is based on a relative potential cost associated with the corresponding fault, and the organization view providing an analysis of a history of the faults to determine whether one of the faults could have been predicted or prevented based on an occurrence of one or more less severe faults compared to the one of the faults.

9. The method of claim 8, wherein the organization view displays the correlations of the faults based on groupings of the one or more machines, the organization view including the visuals separated based on identifications of the one or more machines, identifications of groups to which the one or more machines belong, and timings of occurrences of the faults, and further comprising:
   in response to a fault occurring, providing a recommendation of maintenance based on a correlation between the fault and a more severe fault, compared to the fault, that could be prevented by the maintenance, and based on a relative cost of the maintenance.

10. The method of claim 8, wherein the fault analysis interface includes an instance view, the instance view displaying the correlations of the faults for an instance of use of a single machine, the instance view including the visuals separated based on identifications of the faults and timings of occurrences of the faults, wherein the instance view displays the correlations of the faults further using one or more colors.

11. The method of claim 8, wherein the fault analysis interface includes a subsystem view, the subsystem view displaying the correlations of the faults for a subsystem of the one or more machines, the displayed faults associated with one or more of the one or more machines that have experienced a disabled status during a time period, the subsystem view including the visuals separated based on timings of occurrences of the faults.

12. The method of claim 8, wherein the map view includes the visuals separated based on the locations of the one or more machines during the occurrences of the faults.

13. The method of claim 8, wherein the one or more machines include one or more vehicles.

14. The method of claim 8, wherein the fault information includes system level fault information, message level fault information, and maintenance level fault information.

15. A non-transitory computer readable medium comprising instructions that, when executed, cause one or more processors to perform:
   accessing fault information, the fault information identifying faults for one or more machines; and
   providing a fault analysis interface, the fault analysis interface including a map view and an organization view, the fault analysis interface displaying correlations of the faults using visuals and spatial locations of the visuals, the map view displaying the correlations of the faults based on geographic locations of the one or more machines during occurrences of the faults, the map view indicating a respective severity of each of the faults within different geographic regions including the geographic locations, wherein each of the respective severities is based on a relative potential cost associated with the corresponding fault, and the organization view providing an analysis of a history of the faults to determine whether one of the faults could have been predicted or prevented based on an occurrence of one or more less severe faults compared to the one of the faults.

16. The non-transitory computer readable medium of claim 15, wherein the organization view displays the correlations of the faults based on groupings of the one or more machines, the organization view including the visuals separated based on identifications of the one or more machines, identifications of groups to which the one or more machines belong, and timings of occurrences of the faults, and the instructions further cause the one or more processors to perform:
   in response to a fault occurring, providing a recommendation of maintenance based on a correlation between the fault and a more severe fault, compared to the fault, that could be prevented by the maintenance, and based on a relative cost of the maintenance.

17. The non-transitory computer readable medium of claim 15, wherein the fault analysis interface includes an instance view, the instance view displaying the correlations of the faults for an instance of use of a single machine, the instance view including the visuals separated based on identifications of the faults and timings of occurrences of the faults, wherein the instance view displays the correlations of the faults further using one or more colors.

18. The non-transitory computer readable medium of claim 15, wherein the fault analysis interface includes a subsystem view, the subsystem view displaying the correlations of the faults for a subsystem of the one or more machines, the displayed faults associated with one or more of the one or more machines that have experienced a disabled status during a time period, the subsystem view including the visuals separated based on timings of occurrences of the faults.

19. The non-transitory computer readable medium of claim 15, wherein the map view includes the visuals separated based on the locations of the one or more machines during the occurrences of the faults.

20. The non-transitory computer readable medium of claim 15, wherein the fault information includes system level fault information, message level fault information, and maintenance level fault information.

* * * * *